United States Patent
Sahiri et al.

(10) Patent No.: US 11,525,771 B2
(45) Date of Patent: Dec. 13, 2022

(54) DEVICE FOR A LIGHT-SPECTROSCOPIC ANALYSIS

(71) Applicant: Implen GmbH, Munich (DE)

(72) Inventors: Martin Sahiri, Zorneding (DE); Michael Riepl, Munich (DE)

(73) Assignee: Implen GmbH, Munich (DE)

( * ) Notice: Subject to any disclaimer, the term of this patent is extended or adjusted under 35 U.S.C. 154(b) by 0 days.

(21) Appl. No.: 17/259,141

(22) PCT Filed: Jul. 25, 2019

(86) PCT No.: PCT/EP2019/070044
§ 371 (c)(1),
(2) Date: Jan. 8, 2021

(87) PCT Pub. No.: WO2020/021011
PCT Pub. Date: Jan. 30, 2020

(65) Prior Publication Data
US 2021/0270726 A1    Sep. 2, 2021

(30) Foreign Application Priority Data
Jul. 26, 2018  (DE) ..................... 10 2018 212 489.2

(51) Int. Cl.
*G01N 21/25* (2006.01)
*G01N 21/31* (2006.01)
*G01N 21/64* (2006.01)

(52) U.S. Cl.
CPC ........... *G01N 21/255* (2013.01); *G01N 21/31* (2013.01); *G01N 21/645* (2013.01); *G01N 2021/6417* (2013.01)

(58) Field of Classification Search
CPC .... G01N 21/255; G01N 21/31; G01N 21/645; G01N 2021/6417; G01N 2021/6482; G01N 2021/6484; G01N 21/6452; G01N 21/253
See application file for complete search history.

(56) References Cited

U.S. PATENT DOCUMENTS

| | | | |
|---|---|---|---|
| 6,956,695 B2 * | 10/2005 | Tafas | G01N 21/6458 356/244 |
| 9,089,828 B2 * | 7/2015 | Howell | B01J 19/0046 |
| 2003/0117628 A1 * | 6/2003 | Harju | G01N 35/00623 356/417 |
| 2003/0142309 A1 * | 7/2003 | Kuebler | G01N 35/1097 356/338 |

(Continued)

FOREIGN PATENT DOCUMENTS

| DE | 102012022603 B3 | 5/2014 |
|---|---|---|
| EP | 0266881 A2 | 5/1988 |

(Continued)

OTHER PUBLICATIONS

PCT/EP2019/070044 filed Jul. 25, 2019 International Search Report dated Nov. 14, 2019.

*Primary Examiner* — Shawn Decenzo
(74) *Attorney, Agent, or Firm* — Rutan & Tucker LLP

(57) ABSTRACT

The invention relates to a device for a light-spectroscopic analysis of a, for example, liquid sample. In particular, light should be guided through a sample and then detected and/or analyzed photometrically, spectrophotometrically, fluorometrically, spectrofluorometrically and/or by means of phosphorescence or luminescence.

19 Claims, 5 Drawing Sheets

(56) References Cited

U.S. PATENT DOCUMENTS

| | | | |
|---|---|---|---|
| 2005/0213868 A1* | 9/2005 | Cunningham | B82Y 20/00 385/12 |
| 2010/0007891 A1 | 1/2010 | Carroll et al. | |
| 2011/0059016 A1* | 3/2011 | Ramanujam | G01N 21/6456 424/9.1 |
| 2012/0002190 A1* | 1/2012 | Laitinen | G01N 21/6452 356/32 |
| 2012/0027044 A1* | 2/2012 | Laitinen | G01N 21/6452 374/1 |
| 2012/0190034 A1* | 7/2012 | Tajima | G01N 21/6452 435/6.12 |
| 2013/0228675 A1* | 9/2013 | Chen | G01N 21/0303 250/227.11 |
| 2013/0330230 A1* | 12/2013 | Uri | G01N 21/553 422/69 |
| 2015/0064699 A1* | 3/2015 | Wietzorrek | G01N 21/253 435/6.11 |
| 2017/0030827 A1* | 2/2017 | Nickel | G01N 21/01 |
| 2017/0100715 A1* | 4/2017 | Cherubini | G01N 21/253 |
| 2017/0246635 A1 | 8/2017 | Buermann et al. | |

FOREIGN PATENT DOCUMENTS

| | | | | |
|---|---|---|---|---|
| GB | 2351555 A | 1/2001 | | |
| WO | WO-2007001084 A1 * | 1/2007 | | G01N 35/025 |
| WO | 15082611 A1 | 6/2015 | | |

\* cited by examiner

DEVICE FOR A LIGHT-SPECTROSCOPIC ANALYSIS

This application is a U.S. national stage application of International Application No. PCT/EP2019/070044, which claims the benefit of priority to DE 10 2018 212 489.2, filed Jul. 26, 2018, each of which is incorporated by reference in its entirety into this application.

TECHNICAL FIELD

The invention relates to a device for a light-spectroscopic analysis of a, for example a liquid, sample. In particular, light is to be passed through a sample and subsequently detected and/or analyzed photometrically, fluorometrically, spectrofluorometrically and/or by means of phosphorescence or luminescence.

PRIOR ART

Known as a device of the same category is the device according to WO 2015/082611 A1, which is provided for the light-spectroscopic analysis of a small amount of a liquid sample. The device of WO 2015/082611 A1 comprises: a receiving point for applying a small amount of the liquid sample, and light guides that guide light from a light source to the sample and signal light from the sample in the direction of a detector. This device is further characterized in that an illumination source is provided underneath the receiving point, and a region is provided below the receiving point, which is permeable for the light of the illumination source such that the illumination light illuminates the receiving point.

SUBJECT MATTER OF THE INVENTION

The invention aims at providing a device for a light-spectroscopic analysis with high performance which is configured in a compact manner.

The invention provides for this purpose a device having the features according to claim 1. Further preferred embodiments are stated in the dependent claims and/or the following description.

The device is suitable for a light-spectroscopic analysis and comprises: a base, to which a sample carrier for holding a sample can be mounted or is mounted, a first measuring head configured to guide light generated by a light source to a sample received by the sample carrier and to receive signal light from the sample held by the sample carrier and guide it to a detector, a second measuring head configured to guide light generated by a light source to a sample received by the sample carrier and to receive signal light from the sample held by the sample carrier and guide it to a detector, wherein the first measuring head and the second measuring head are movable relative to the base.

The device according to the invention in particular has the advantage that the first and second measuring heads allow a compact arrangement of the device. In particular, movement paths can be reduced. In addition to a compact design, a high a degree of measurement accuracy can be ensured.

According to one embodiment, the device moreover comprises the light source for providing the light to the first measuring head and/or second measuring head. In this connection, it is preferred according to a further embodiment that the light source comprises a Xenon lamp, in particular a Xenon flash lamp. A very high quality analysis is thus guaranteed.

It is preferred that the device further comprises the detector for the analysis of the signal light from the first measuring head and/or the second measuring head. It can thereby be provided that the detector is a spectrometer, in particular a fluorescence spectrometer or a luminescence spectrometer. These measures also guarantee a possibility for an excellent quality analysis.

Moreover, the first measuring head and the second measuring head can be mounted to a carriage such that a compact and structurally more stable and more simple configuration is provided.

In one embodiment, it is provided that the light source and/or the detector is/are also mounted to the carriage. In this manner, the accuracy and stability of the optical alignment of these components can be improved and the assembly space further reduced.

It is preferred that the device comprises a linear motor to drive the carriage. This enables an extremely precise and low-vibration feed possibility for moving the carriage.

In one embodiment, a hanging configuration is provided. The carriage can thereby comprise one or more guide members to guide the carriage in a hanging manner. Thus, a device with extremely small dimensions can be provided for practical use for analysis.

The first measuring head and the second measuring head are spaced apart from each other such that in each case only one of the measuring heads can perform a light-spectroscopic analysis on a sample received by the sample carrier. Errors during detection can thus be effectively avoided.

In a further variant, it is provided that the first measuring head and the second measuring head are movable along a translational axis. Further preferably, it is provided that the first measuring head and the second measuring head are movable along a translational axis, particularly preferably along two translational axes. It thus becomes possible to analyze several samples that are disposed—for example in a lattice-like manner—along this axis/these axes. Furthermore, a precise adjusting movement can also be ensured with a cost-effective implementation.

The first measuring head and the second measuring head can be attached to a common measuring head carrier. A stable and compact configuration of the device can thus be ensured.

It is preferred that a light-emitting aperture of the first measuring head and the second measuring head points upwards in the vertical direction during operation of the device. This allows the formation of a particularly ergonomic device.

In one embodiment, it is provided that the device comprises a reflector that is disposed, or positionable, opposite the sample carrier. By means of the reflector integrated accordingly in the device, the excitation light that has already passed through the sample once is reflected back and enables a higher signal yield due to the renewed passage through the sample. The portion of signal light generated in the sample, that is directed away from the detector, is also reflected back and can improve the detection sensitivity (for example by a better signal-to-noise ratio). Last but not least, the reflector also allows a space-saving configuration.

The first measuring head and/or the second measuring head are movable relative to the sample carrier to change the distance between the first measuring head and/or the second measuring head as well as the sample carrier. Thus, in particular, a mechanically operated focusing can be performed.

In a further embodiment, it is provided that the sample carrier has sample positions (sample receivers) outside of which the sample carrier is provided with a hydrophobic coating or a printed structure. This coating or structure prevents the sample from running or flowing off and thus eliminates the need to provide recesses for holding the sample in the sample holder, which are curved optical surfaces and thus difficult to handle. By means of a hydrophobic coating or the printed structure, the possible cleaning of the device is also made considerably easier, and therefore non-productive times can be reduced.

According to a further variant, the device comprises a third measuring head and a fourth measuring head. It can be provided in a preferred variant that the sample carrier can have sample positions in a matrix arrangement, for example a matrix arrangement with 3×5, 4×5 or 4×6 sample positions. With this variant and the above-mentioned further configurations, the performance of the device can be once again significantly increased. In particular, a larger number of samples can be analyzed in one measurement session.

The first measuring head and the second measuring head can form a first pair of measuring heads, and the third measuring head and the fourth measuring head can form a second pair of measuring heads. Owing to the configuration in pairs, the complexity of the system can be reduced and a space-saving configuration ensured.

Preferably, the pairs of measuring heads are movable independently of each other such that a high degree of flexibility can be ensured.

Preferably, a further light source and a further detector are provided for the second pair of measuring heads, and therefore a further evaluation possibility is available.

In one embodiment, it can be provided that the third measuring head and the fourth measuring head are movable along a translational axis. It is further preferred that the third measuring head and the fourth measuring head are movable along two translational axes. Thus, a precise adjusting movement can be guaranteed with a cost-effective implementation.

The invention further relates to the use of a device according to the aforementioned aspects for analyzing one or more samples.

The invention is also directed at a method, in particular a method for the light-spectroscopic analysis using a device, wherein the device comprises a first measuring head and a second measuring head. The method comprises the steps of: analyzing a first sample by the first measuring head, moving the first measuring head and the second measuring head, and analyzing a second sample by the second measuring head. Said steps are in particular performed in the aforementioned sequence.

Furthermore, it can be provided that after the movement of the first measuring head and the second measuring head, an analysis is performed on a further sample by the first measuring head.

DESCRIPTION OF THE PREFERRED EMBODIMENT

In the following, preferred embodiments will be described for illustrating the invention. Even though the described embodiments are to be understood purely as examples, and are not restrictive, features of the embodiments can also be used individually to specify the invention. Modifications of certain features of the preferred embodiments can be combined with variants of other features in order to form further embodiments.

Figure 1:
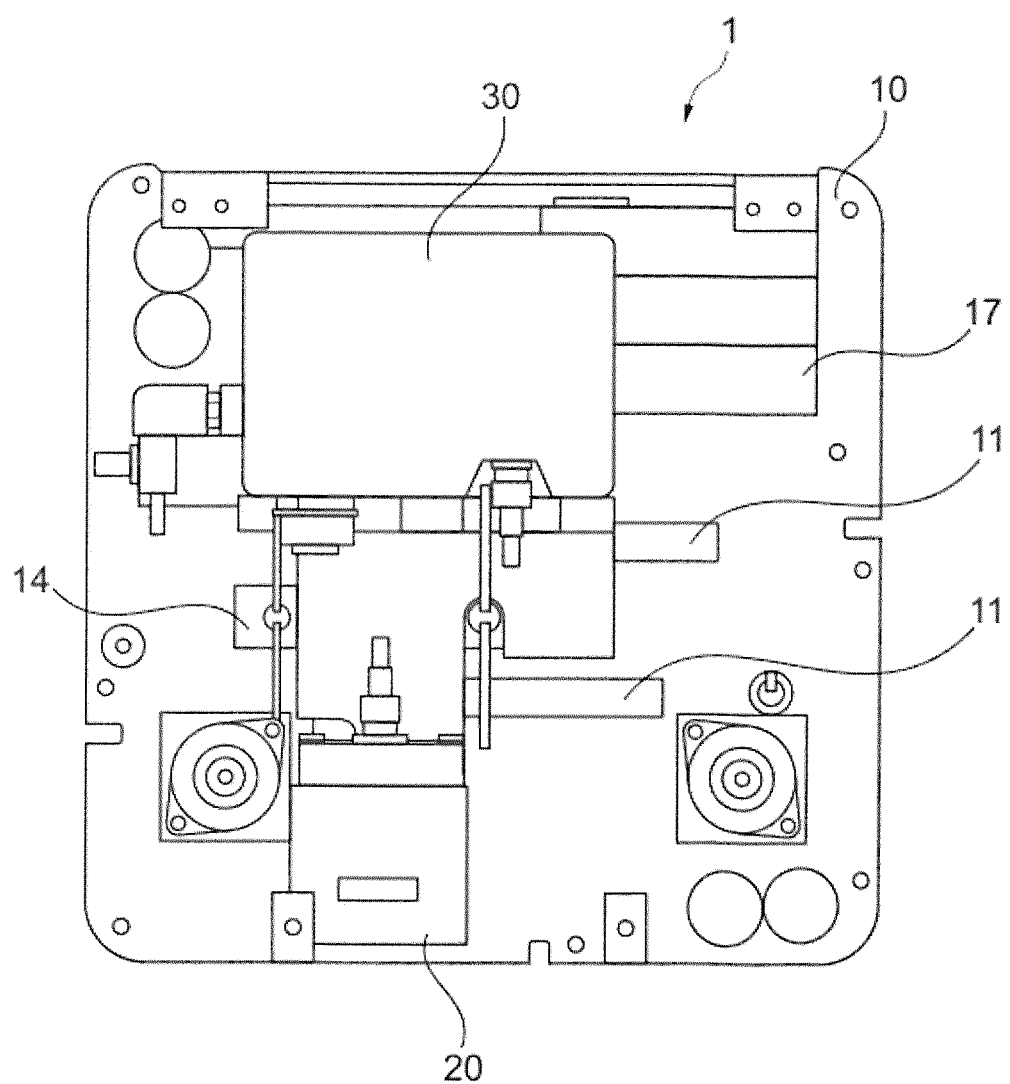
FIG. 1 shows a first embodiment of a device according to the invention.

FIG. 1 shows one embodiment of a device 1 that is provided for a light-spectroscopic analysis. The device 1 is shown without a housing in order to explain the components of the device 1 more clearly. However, to protect the components of the device 1, they are accommodated in such a housing in the practical implementation.

The device 1 comprises a base 10 which constitutes an upper side of such a housing of the device or is received adjacent to the upper side within such a housing. A sample carrier 16 is provided on the outwardly facing (upper) side of the base 10 or on the upper side of the housing, wherein the sample carrier 16 receives one or more samples. A power source 17, for example a rechargeable battery, is disposed on the base 10.

Figure 2:
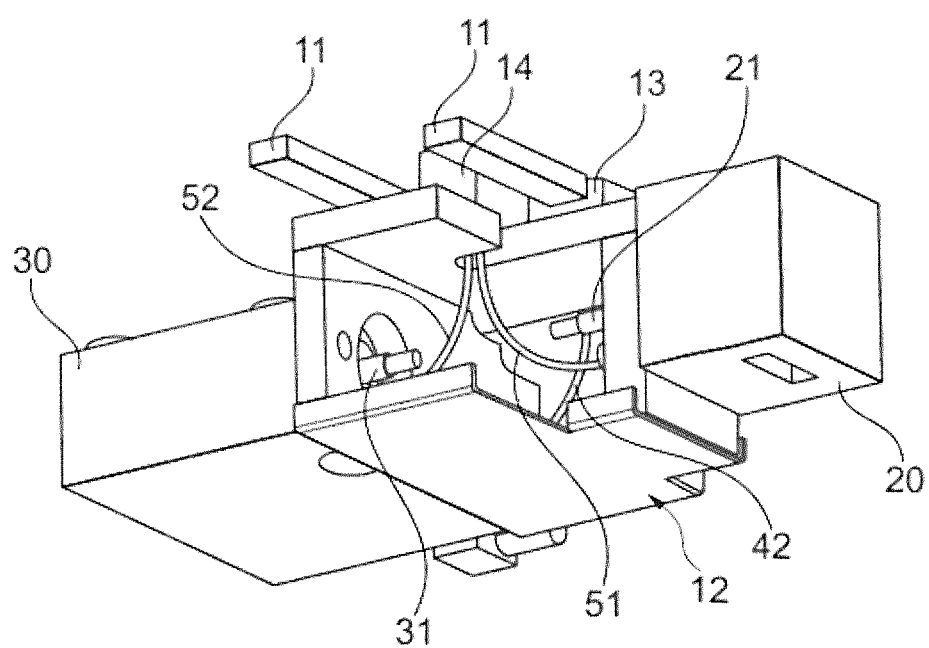
FIG. 2 is a perspective partial view of the embodiment according to FIG. 1.

The device 1 further comprises rails 11 along which a carriage 12 is movable, wherein the carriage 12 comprises guide members 13 engaging with the rails 11 (cf. FIG. 2). The carriage 12 is thereby arranged in the device 1 in a hanging manner and is provided below the rails 11 when the device 1 is in the use state.

Mounted to the carriage 12 is a light source 20 which, in the present embodiment, is a Xenon flash lamp. According to a modification of the embodiment, the light source 20 can also be configured as an LED lamp (mainly for the VIS and IR range, but recently also UV) or deuterium lamp (especially for the UV range). A detector 30, which in the present embodiment is a spectrometer, is provided on a side of the carriage 12, that is opposite the light source 20.

The light source 20 is used to generate light which, as described below, is emitted onto a sample, penetrates this sample and is then analyzed by the detector after receiving signal light, i.e. light coming from the sample.

For this purpose, a first light line 41 and a second light line 51 are coupled to the light source 20 by means of an SMA connector 21. The first light line 41 is connected to a first measuring head 43, whereas the second light line 51 is coupled to a second measuring head 53. The measuring heads 43, 53 are mounted to a common measuring head carrier 14.

The first measuring head 43 and the second measuring head 53 are movable together along the sample carrier. Moreover, the measuring heads can be adjusted relative to the sample carrier (Z direction) to adapt the focusing of the measuring heads.

The light lines 41, 51 are fiber optic cables that are configured to conduct the light emitted by the light source 20 to the respective measuring head 43, 53.

The first measuring head 43 is in contact with a signal line 42. Accordingly, the second measuring head 53 is connected to a second signal line 52. The first signal line 42 and the second signal line 52 are connected to the detector (spectrometer) by means of a fiber optic connector 31.

The sample carrier 16 is made, for example, of quartz glass and includes several sample positions 16a to receive, in particular, a liquid sample. Each of the sample positions 16a is configured as a window that is transparent for the excitation and signal radiation used. In the illustration in FIG. 1, the sample carrier 16 is provided on the side of the base that is opposite the rails 11, which is not shown.

The sample positions 16a are provided as sections on the sample carrier 16. If there is an uncoated sample carrier, these sections can be formed by wells or recesses in the sample carrier. Alternatively, the sample positions can be defined such that outside the sample position, the sample carrier 16 is provided with a hydrophobic coating, for example silane or Teflon, or a ceramic surface. The sample positions 16*a* can also be delimited by a printed portion. This ensures that a sample remains in the region of the respective sample position.

On the side of the sample carrier 16 facing away from the first and second measuring heads 43, 53, a reflector 15 is attached to the base. This reflector has reflector sections 15*a*, each of which are opposite the sample positions 16*a*.

Figure 3:
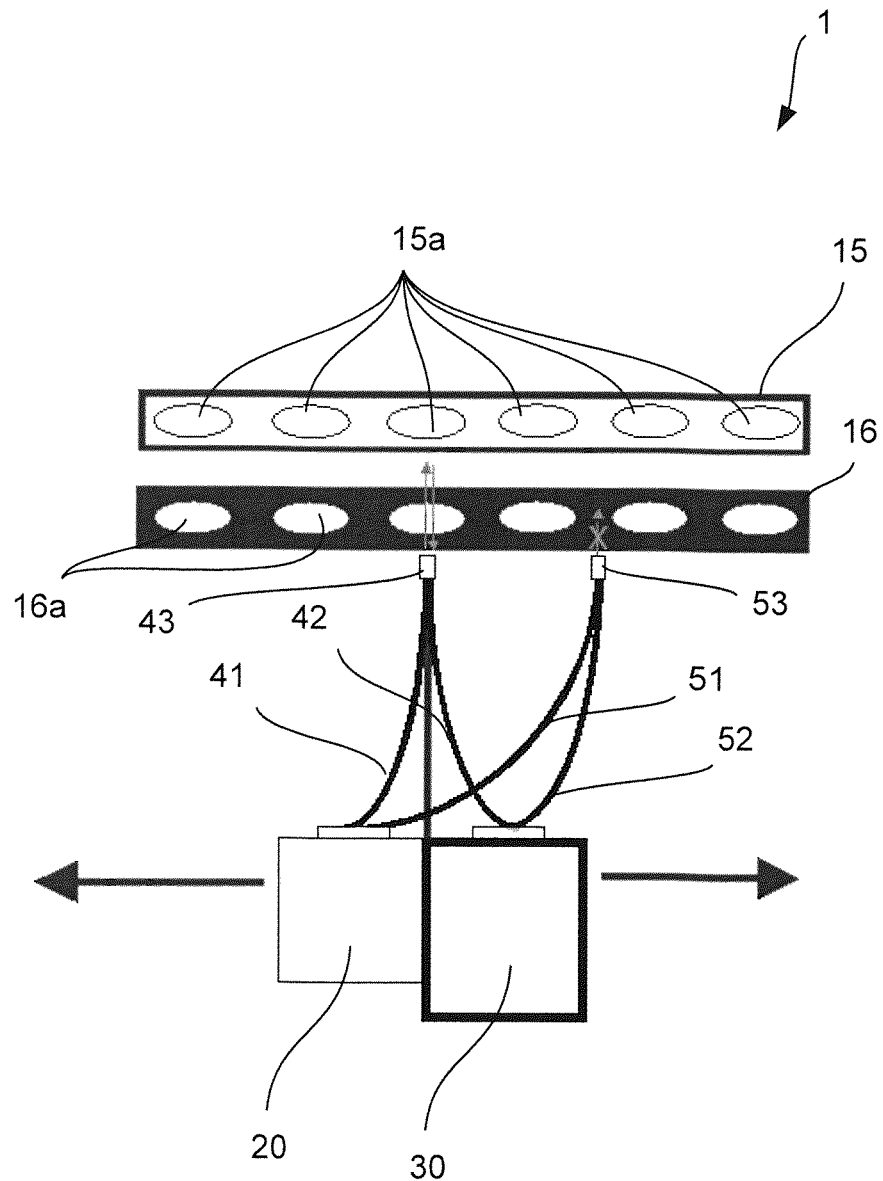
FIG. 3 is a schematic view of the first embodiment of the invention to explain the mode of operation of the device.

In the schematic view of FIG. 3, the function of the device 1 is clearly illustrated. Excitation light sent through the light lines 41, 51 is passed by the measuring head 43, 53 through a sample position 16*a* and the sample located therein, reflected by the corresponding mirror section 15*a* and then sent through the sample again. Each time the excitation light passes through, the sample is excited and caused to generate signal light. This signal light is then fed back from the measuring head 43, 53 into the signal fibers 42, 52 and is directed further to the detector 30.

It can be seen that the first measuring head 43 and the second measuring head 53 are spaced from each other such that always only one of the measuring heads can be positioned opposite an opening 16*a* of the sample carrier 16.

As stated before, the carriage 12 which accommodates the light source 20, the detector 30, the light line 41, 51, the signal lines 42, 52 and the measuring heads 43, 53, is movable along the rails 11 in a translational movement.

The light lines 41, 51 and the signal lines 42, 52 are configured such that they can be deformed in a certain bending radius. Due to the distance of the measuring heads 43, 53, it is provided that the first measuring head 43, in the example of FIG. 3, can analyze the sample positions 16*a* on the left side of the sample carrier 16, whereas the second measuring head 53 is provided for the sample positions 16*a* located on the right side in FIG. 3. It is thus ensured that only one of the measuring heads 43, 53 performs an analysis.

Figure 4:
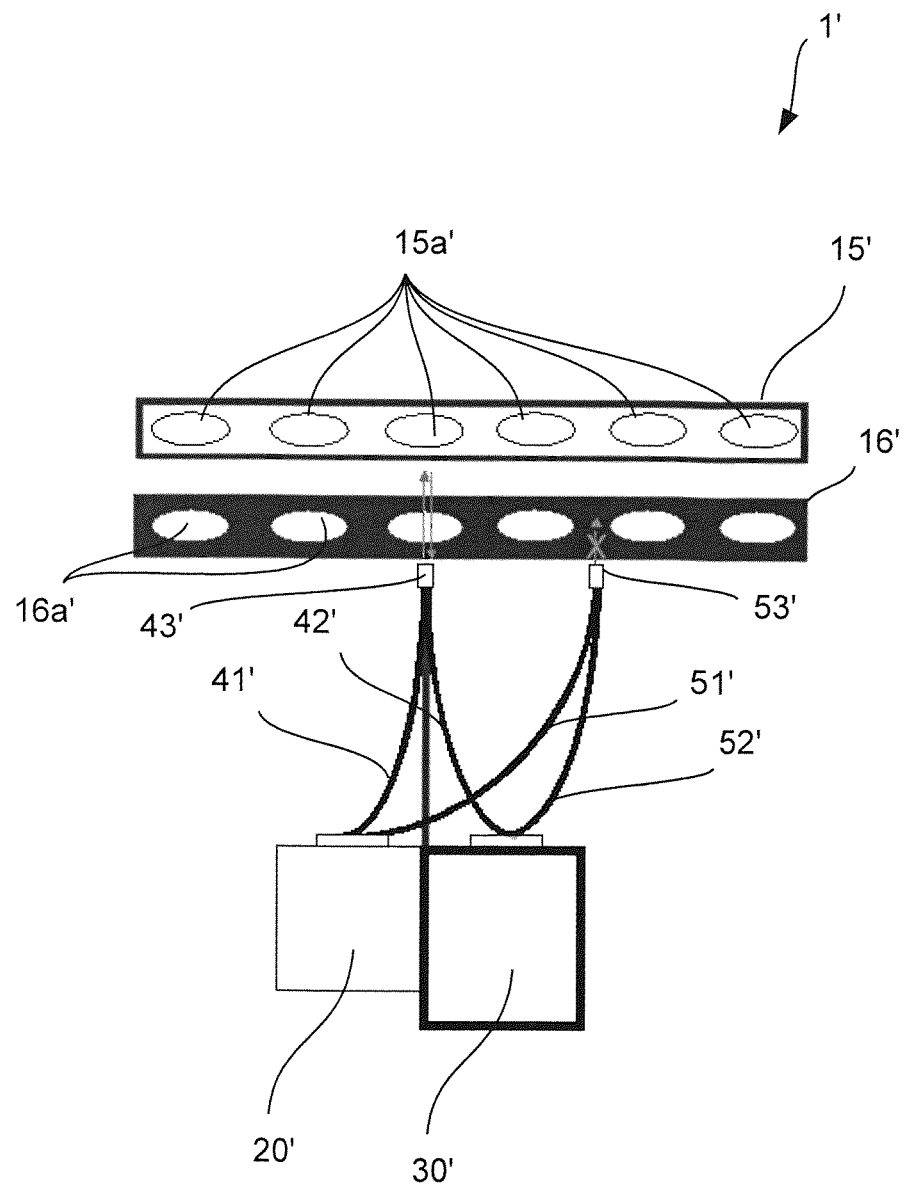
FIG. 4 shows a schematic view of a second embodiment.

A second embodiment of a device 1' according to the invention is described by the schematic illustration of FIG. 4. The device 1' can be configured as shown in FIGS. 1 to 2.

Like the first embodiment, the device 1' comprises a light source 20' as well as a detector 30'. The light source 20' is connected to a first light line 41' having a first measuring head 43' and to a second light line 51' having a second measuring head 53'. Starting from the first measuring head 43', a signal line 42' is connected to the detector 30'. A second signal line 52' is also provided to couple the second measuring head 53' to the detector 30'.

Similar to the first embodiment, a sample carrier 16' with openings 16*a*' is provided, wherein a reflector 15' with reflector sections 15*a*' can be arranged opposite the sample carrier 16'.

The second embodiment primarily differs from the first embodiment in that the light source 20' and the detector 30' are not mounted to a carriage but are arranged so as to be stationary in the housing of the device 1'.

Regarding further features or detailed explanations of the features stated in relation to the second embodiment, reference is made to the previous explanations.

A further variant is described below by means of the top view of a third embodiment shown in FIG. 5.

The device of the third embodiment comprises a plurality of sample positions 16*a*" that are arranged in a matrix-like manner. Specifically, 4×5 sample positions 16*a*" are provided, wherein a different number of sample positions 16*a*", for example 4×4, 4×6, etc., can also be provided according to further modifications of the third embodiment.

The device of the third embodiment comprises four measuring heads 43", 53", 63", 73". The measuring heads 43", 53", 63", 73" are coupled to each other and spaced relatively from one another such that always only one of the measuring heads detects a sample located at a sample position 16*a*" and accordingly only this measuring head emits a corresponding measuring signal.

Figure 5:
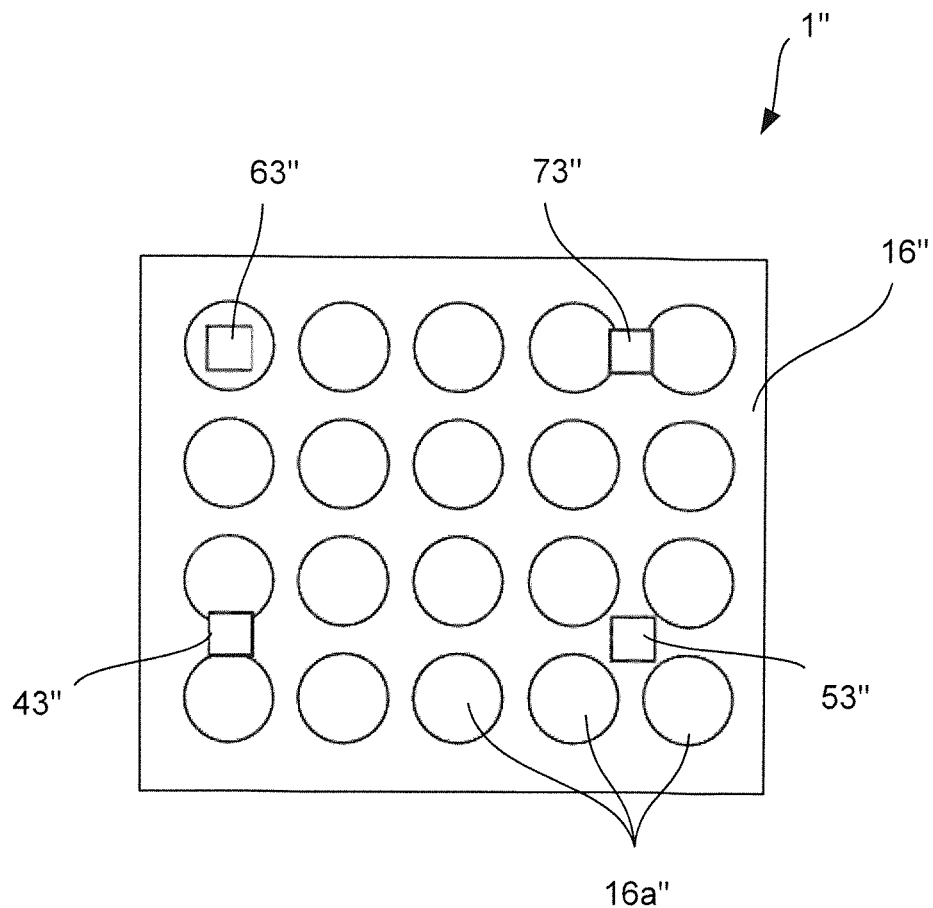
FIG. 5 shows a schematic top view of a third embodiment.

The first pair of measuring heads of sample heads 43", 53" as well as the second pair of measuring heads of sample heads 63", 73" are carried by a common carriage and are thus movable in a plane, in particular in the X and Y direction (see also FIG. 5). Moreover, the pairs of measuring heads can be adjusted relative to the sample carrier to change the focusing of the measuring heads.

Regarding further features or detailed explanations of the features mentioned in relation to the third embodiment, reference is made to the previous embodiments.

According to a modification of the third embodiment, it is possible to mount the first pair of measuring heads and the second pair of measuring heads to separate carriages such that the pairs of measuring heads can be moved independently of each other. This increases the flexibility of the device.

The invention claimed is:

1. A device for a light-spectroscopic analysis, comprising:
a base to which a sample carrier for holding a sample is mounted;
a first measuring head configured to guide light generated by a light source to a first sample received by the sample carrier and to receive signal light from the first sample held by the sample carrier and guide it to a detector;
a second measuring head arranged along a first axis relative to the first measuring head and configured to guide light generated by the light source to a second sample received by the sample carrier and to receive signal light from the second sample held by the sample carrier and guide it to the detector;
a third measuring head arranged along a second axis relative to the first measuring head, the second axis perpendicular to the first axis, the third measuring head configured to guide light generated by the light source to a third sample received by the sample carrier and to receive signal light from the third sample held by the sample carrier and guide it to the detector;
wherein the first measuring head, the second measuring head, and the third measuring head are movable relative to the base, and wherein the first measuring head, the second measuring head, and the third measuring head are spaced apart from each other such that only one of the first measuring head, the second measuring head, or the third measuring head can guide light to the first sample, the second sample, or the third sample, respectively.

2. The device according to claim 1, further comprising the light source for providing the light to one or more of the first measuring head, the second measuring head, and the third measuring head, wherein the light source comprises a Xenon flash lamp.

3. The device according to claim 1, wherein the detector is configured for analysis of the signal light of the first measuring head, the second measuring head, or the third measuring head, and wherein the detector is a fluorescence spectrometer or a luminescence spectrometer.

4. The device according to claim 1, wherein the first measuring head and the second measuring head are mounted to a carriage.

5. The device according to claim 4, wherein one or both of the light source and the detector are mounted to the carriage.

6. The device according to claim 4, wherein the device comprises a linear motor to drive the carriage.

7. The device according to claim 4, wherein the carriage comprises one or more guide members to guide the carriage in a hanging manner.

8. The device according to claim 1, wherein the first measuring head and the second measuring head are movable along a translational axis or two adjacent translational axes.

9. The device according to claim 1, wherein the first measuring head and the second measuring head are attached to a common measuring head carrier.

10. The device according to claim 1, wherein a light-emitting aperture of the first measuring head and the second measuring head points upwards in a vertical direction during operation of the device.

11. The device according to claim 1, further comprising a reflector that is disposed, or can be positioned, opposite the sample carrier.

12. The device according to claim 1, wherein one or both of the first measuring head and the second measuring head are movable relative to the sample carrier to change a distance between one or both of the first measuring head and the sample carrier, and the second measuring head, and the sample carrier.

13. The device according to claim 1, wherein the sample carrier has sample positions outside of which the sample carrier is provided with a hydrophobic coating or a printed structure.

14. The device according to claim 1, further comprising a fourth measuring head, wherein the sample carrier has sample positions in a matrix arrangement having 3×5, 4×5 or 4×6 sample positions.

15. The device according to claim 14, wherein the first measuring head and the second measuring head form a first pair of measuring heads, and the third measuring head and the fourth measuring head form a second pair of measuring heads, wherein the first and the second pairs of measuring heads are movable independently of each other.

16. The device according to claim 15, further comprising a second light source and a second detector for the second pair of measuring heads.

17. The device according to claim 14, wherein the third measuring head and the fourth measuring head are movable along a translational axis or two translational axes.

18. A method of using a device for the light-spectroscopic analysis of one or more samples, comprising:

mounting a sample to a sample carrier that is coupled to a base, the sample carrier configured for holding one or more samples;

guiding light generated by a light source to the sample by a first measuring head, the first measuring head arranged along a first axis relative to a second measuring head, and arranged along a second axis relative to a third measuring head, the first axis perpendicular to the second axis;

guiding signal light from the sample to a detector by the first measuring head while preventing signal light from the second measuring head and the third measuring head;

moving the first measuring head, the second measuring head, and the third measuring head relative to the base along the first axis;

guiding light generated by the light source to the sample by the second measuring head;

guiding signal light from the sample to the detector by the second measuring head while preventing signal light from the first measuring head and the third measuring head;

moving the first measuring head, the second measuring head, and the third measuring head relative to the base along the second axis;

guiding light generated by the light source to the sample by the third measuring head; and guiding signal light from the sample to the detector by the third measuring head while preventing signal light from the first measuring head and the second measuring head.

19. A light-spectroscopic analysis method, comprising:

directing light from a light source to a first measuring head, a second measuring head, and a third measuring head;

receiving a first reflected light to the first measuring head while preventing receiving the first reflected light to the second measuring head, and the third measuring head, to analyze a first sample;

moving the first measuring head, the second measuring head, and the third measuring head along a first axis;

receiving a second reflected light to the second measuring head while preventing receiving the second reflected light to the first measuring head, and the third measuring head, to analyze a second sample;

moving the first measuring head, the second measuring head, and the third measuring head along a second axis perpendicular to the first axis; and receiving a third reflected light to the third measuring head while preventing receiving the third reflected light to the first measuring head, and the second measuring head, to analyze a third sample.

\* \* \* \* \*